(12) United States Patent
Audemard D'Alançon

(10) Patent No.: US 10,755,361 B2
(45) Date of Patent: Aug. 25, 2020

(54) METHODS AND DEVICES FOR CONTROLLING ANCILLARY OPERATIONS RELATED TO THE EXECUTION OF MAIN TRANSACTIONS

(71) Applicant: HEOH, Paris (FR)

(72) Inventor: Ghislain Audemard D'Alançon, Paris (FR)

(73) Assignee: HEOH, Paris (FR)

( * ) Notice: Subject to any disclaimer, the term of this patent is extended or adjusted under 35 U.S.C. 154(b) by 246 days.

(21) Appl. No.: 15/541,438

(22) PCT Filed: Jan. 4, 2016

(86) PCT No.: PCT/FR2016/050001
§ 371 (c)(1),
(2) Date: Jul. 3, 2017

(87) PCT Pub. No.: WO2016/110635
PCT Pub. Date: Jul. 14, 2016

(65) Prior Publication Data
US 2018/0268492 A1 Sep. 20, 2018

(30) Foreign Application Priority Data
Jan. 5, 2015 (FR) ...................................... 15 50025

(51) Int. Cl.
*G06Q 40/00* (2012.01)
*G06Q 30/02* (2012.01)
(Continued)

(52) U.S. Cl.
CPC ............. *G06Q 40/12* (2013.12); *G06Q 20/10* (2013.01); *G06Q 20/20* (2013.01); *G06Q 20/207* (2013.01);
(Continued)

(58) Field of Classification Search
CPC .... G06Q 40/12; G06Q 20/207; G06Q 20/405; G06Q 20/22; G06Q 20/20; G06Q 20/29; G06Q 30/0279; G06Q 20/10
See application file for complete search history.

(56) References Cited

U.S. PATENT DOCUMENTS 5,466,919 A 11/1995 Hovakimian
6,014,635 A 1/2000 Harris et al.
(Continued)

FOREIGN PATENT DOCUMENTS

EP 1 136 931 A1 9/2001
WO 03/052709 A1 6/2003

OTHER PUBLICATIONS

"Important Information and FAQs about Change Jar". Virginia Credit Union. <https://www.vacu.org/sites/default/files/2018-11/changejar.pdf>. Sep. 2013. (Year: 2013).*
(Continued)

*Primary Examiner* — Nathan A Mitchell
(74) *Attorney, Agent, or Firm* — Nixon & Vanderhye

(57) ABSTRACT

Disclosed is a method of instructing an annex operation linked to the execution of a main transaction in a bank payment system including at least two distinct client devices and a third party device connected to an annex operation managing system, that is configured to carry out a main transaction between the two client devices. After having received from the third party device, in the annex operation managing system, information relative to the execution of the main transaction between the two client devices, at least one rule for executing the annex operation is identified according to at least one first information item of the received information. The annex operation is then executed according to the at least one identified rule and according to
(Continued)

at least one second information item of the received information, that is distinct from the first information item.

19 Claims, 4 Drawing Sheets

(51) Int. Cl.
    *G06Q 20/10*     (2012.01)
    *G06Q 20/22*     (2012.01)
    *G06Q 20/20*     (2012.01)
    *G06Q 20/40*     (2012.01)

(52) U.S. Cl.
    CPC ............. *G06Q 20/22* (2013.01); *G06Q 20/29* (2013.01); *G06Q 20/405* (2013.01); *G06Q 30/0279* (2013.01)

(56) References Cited

U.S. PATENT DOCUMENTS

| | | | |
|---|---|---|---|
| 6,088,682 A * | 7/2000 | Burke | G06Q 20/04 235/375 |
| 6,876,971 B1 | 4/2005 | Burke | |
| 2002/0008146 A1 | 1/2002 | Singhal | |
| 2002/0116214 A1 * | 8/2002 | Horn | G06Q 30/02 705/329 |
| 2002/0120513 A1 | 8/2002 | Webb et al. | |
| 2002/0120539 A1 | 8/2002 | Price | |
| 2004/0024698 A1 * | 2/2004 | Hines | G06Q 20/10 705/39 |
| 2004/0030767 A1 * | 2/2004 | Keller | H04L 12/46 709/223 |
| 2004/0182922 A1 | 9/2004 | Talarico, Jr. | |
| 2005/0021363 A1 * | 1/2005 | Stimson | G06Q 20/105 705/44 |
| 2005/0051617 A1 | 3/2005 | Gorelick | |
| 2005/0171849 A1 | 8/2005 | Brissette | |
| 2006/0089874 A1 * | 4/2006 | Newman | G06Q 30/02 705/14.32 |
| 2006/0122856 A1 | 6/2006 | Rushton et al. | |
| 2006/0122874 A1 * | 6/2006 | Postrel | G06Q 30/02 705/26.1 |
| 2007/0080213 A1 * | 4/2007 | Workman | G06Q 20/10 235/380 |
| 2008/0281690 A1 * | 11/2008 | Tietzen | G06Q 30/02 705/14.27 |
| 2010/0145812 A1 * | 6/2010 | Worth | G06Q 20/00 705/17 |
| 2010/0228669 A1 * | 9/2010 | Karim | G06Q 20/10 705/42 |
| 2010/0228672 A1 * | 9/2010 | Karim | G06Q 20/40 705/44 |
| 2012/0084162 A1 | 4/2012 | Smith et al. | |
| 2014/0229397 A1 * | 8/2014 | Fink | G06Q 30/0279 705/329 |
| 2015/0006426 A1 | 1/2015 | Sobhani et al. | |
| 2016/0314466 A1 * | 10/2016 | Wind, III | G06Q 20/201 |
| 2017/0069027 A1 * | 3/2017 | Narayana | G06Q 40/06 |
| 2017/0069028 A1 * | 3/2017 | Narayana | G06Q 40/06 |
| 2017/0124538 A1 * | 5/2017 | Rouda | G06Q 20/10 |
| 2017/0213278 A1 * | 7/2017 | Wind | G06Q 30/0633 |
| 2017/0243173 A1 * | 8/2017 | Witten | G07F 5/24 |
| 2017/0286925 A1 * | 10/2017 | Trubnikov | G06Q 20/10 |

OTHER PUBLICATIONS

"In for a Penny. Can Micro-Donations Benefit Global Road Safety?". FIA Foundation Research Series, Paper 4. Jul. 2015. (Year: 2015).*
International Search Report, dated Feb. 26, 2016, from corresponding PCT/FR2016/050001 application.
International Search Report, dated Dec. 17, 2015, from corresponding/related International Application No. PCT/FR2015/052472.
Office Action, dated Oct. 18, 2018, from corresponding/related U.S. Appl. No. 15/511,037.
Final Office Action, dated May 29, 2019, from corresponding/related U.S. Appl. No. 15/511,037.
Office Action, dated Feb. 18, 2020, from corresponding/related U.S. Appl. No. 15/511,037.

* cited by examiner

METHODS AND DEVICES FOR CONTROLLING ANCILLARY OPERATIONS RELATED TO THE EXECUTION OF MAIN TRANSACTIONS

BACKGROUND OF THE INVENTION

Field of the Invention

The present invention concerns the management of financial transactions made by debtors with creditors via bank accounts of the latter. More precisely, the invention concerns methods and devices for instructing annex operations linked to the execution of main operations, for example management of donations further to payments by bank cards, carried out using devices connected by a communication network.

Description of the Related Art

Whereas conventionally donations were made autonomously, for example by sending a check or a transfer to a general interest entity or by providing change to a representative of an association, there are now applications implemented by computer (that is to say, in practice, on computers, personal digital assistants, smartphones or the like).

An essential feature of the computer-implemented mechanisms for collecting donations concerns the quality of the interfaces enabling donations to be made so that a user is not inclined to dismiss a donation offer due to complexity, excessive time, uncertainty as to the amount, beneficiary or the reliability of the procedure, etc.

While these mechanisms generally follow simple monetary rules by providing, for example, to round a sum to pay for a purchase to the integer above or to pay a predetermined sum for each purchase, the implementation is generally complex for meeting the needs of simplicity of the user and of security concerning the transactions. Furthermore, there is a high demand for traceability of the donations, in particular for tax purposes.

FIG. 1 diagrammatically illustrates an environment in which a mechanism for collecting donations can be implemented enabling a client to make a micro-donation at the time of a purchase, for example a donation of the difference between the price to pay and that price rounded to the integer above.

As illustrated, the environment 100 enables a client 105 having a payment card to make purchases from a merchant having a computer infrastructure 110. In addition to this infrastructure, the environment 100 here comprises a computer system 115 linked to a bank of the merchant, a computer system (not shown) linked to a bank of the client and a computer system 120 linked to a bank of an organization 125 of NGO type (NGO standing for Non-Governmental Organization).

The computer infrastructure 110 of the merchant here comprises, in particular, a computerized accounting system 130, a cash register software application 135 associated with a cash register operated by a checkout operator and a payment terminal 140. The computerized accounting system 130 and the cash register software application 135 are connected to each other by a communication network, for example a network of Ethernet type using IP protocol (IP standing for Internet Protocol).

The computer systems linked to the banks are connected together and to the computerized accounting system 130 as well as to the payment terminal 140 by a communication network of Internet type, the exchanges of data being made secure, for example by encryption.

The donation collection mechanism is generally for the most part implemented in the computerized accounting system 130 of the merchant as well as in its cash register software application.

When a client proceeds to checkout to make the payment for his purchasers (step ①), for an amount denoted M, the checkout operator asks him whether he wishes to make a donation for an amount denoted D (step ②). If the client declines, the payment procedure continues in a conventional manner (not shown).

By contrast, if the client agrees to make a donation (step ③), the checkout operator presses a specific button to calculate a donation value based on the rounding to the integer above of the amount of the purchasers, scans a specific barcode to obtain a similar result or inputs the amount of the donation using the cash register software application (step ③'). This input is typically carried out by adding a particular reference to the list of the references for the products purchased by the client, this particular reference designating a donation and enabling, the case arising, the manual input of an amount by the checkout operator.

It may be noted that several particular references may each be used to designate an organization to which the donation must be made. The donation is thus integrated in the sales receipt of which the indicated total amount, denoted T, comprises the amount of the real purchases (M) and the donation amount (D). In other words, $T=M+D$.

In a following step (step ④), the total amount (T) indicated on the sales receipt, the amount of the real purchases (M) and the amount of the donation (D) are sent by the cash register software application 135 to the computerized accounting system 130 of the merchant.

If the payment for the purchases is made by bank card (and not in cash or by check), the cash register software application automatically sends the amount to pay (T) to the payment terminal 140. Alternatively, that amount is manually input by the checkout operator on the payment terminal 140. If it is authorized, the client validates the payment using his secret code The computer system of the merchant's bank telecollects the merchant's takings, typically periodically, and through bank intermediation presents the amount of the payments ($T=M$ or $T=M+D$ depending on whether the client has made a donation or not) to credit on an account of the merchant with a corresponding amount (step ⑤).

In parallel, the merchant's computerized accounting system 130 updates account journals in which appear the amounts of the real purchases (M) and the amounts of the donations (D), typically by beneficiary organization. The separate management of the amounts of the real purchases (M) and of the amounts of the donations (D) is necessary for accounting reasons (linked for example to VAT, standing for Value Added Tax) and tax reasons (in particular for calculating the turnover within which the amount of the donations must not be included).

The account journal for the donations is in particular used by the merchant to periodically transfer, for example every month, the total amount of the donations received on behalf of one or more organizations. Such payments are typically made by order of the merchant to his bank, the latter carrying out the transaction order (steps ⑥ and ⑥'). The organization or organizations then have available the donations paid to carry out their missions (step ⑦).

It is observed here that implementation of the collection mechanisms for donations or micro-donations such as the one described with reference to FIG. 1 require substantial modifications to the devices used.

Thus, in particular, it is necessary to modify the cash register software application and/or to add a software application cooperating therewith, to enable the input of at least one particular reference designating a donation and enabling the calculation of an associated amount or the manual input of an associated amount, in order for a particular article, not subject to VAT, to be added to a sales receipt.

It is also necessary to modify the computerized accounting system of the merchant to enable separate management of the real purchase amounts and of the donation amounts, to enable the processing of references of products assimilated with donations and not subject to VAT (these amounts must not be included in the calculation of the turnover), to manage different account journals and to credit external accounts (accounts associated with organizations of NGO type) as well as to calculate the exact amount of the turnover.

Furthermore, it should be noted that the implementation of these donation collection mechanisms requires involvement of the checkout staff in relation to the clients. Thus, for example, the checkout operators must "petition" clients to make a donation then, where appropriate, handle the initiation of the donation management process. This excess work is generally considered to be unpleasant by checkout operators who feel they are begging for donations. Furthermore, this method may have an unpleasant psychological influence and be considered as intrusive by the client who feels trapped in that a refusal may be ill considered by a checkout operator or a client situated nearby when the question is asked.

Thus, the constraints imposed by these donation collection mechanisms have considerable consequences.

Furthermore, there is a risk of substantially slowing down the checkout due to the complexity of the procedure.

Lastly, the modifications to be made to the cash register software application in the merchant's computerized accounting system are very costly (typically of the order of several million euros in the case of a retail chain operating nationwide). It is observed here that it is very difficult to export the modifications from one merchant to another, thereby involving repetition of the modification operations and therefore of the related costs.

Lastly, the transfer and the management of the funds are the merchant's responsibility, without real verifications being possible. The traceability of the donations is therefore not ensured, leading to problems such as tax exemption problems.

BRIEF SUMMARY OF THE INVENTION

The invention enables at least one of the problems set forth above to be solved.

The invention thus relates to a method of instructing an annex operation linked to the execution of a main transaction, this method being implemented in an annex operation managing system that is connected to a third party device of a bank payment system further comprising at least two distinct client devices, the bank payment system being configured to carry out a main transaction between the two client devices, and comprising the following steps
  receiving information relative to the execution of said main transaction between the two client devices, said information being received from said third party device;
  identifying at least one execution rule for executing the annex operation according to at least one first information item of the received information; and
  executing the annex operation according to said at least one identified rule and according to at least one second information item of said received information, that is distinct from said first information item.

The method according to the invention thus provides the possibility of making donations at the time of a payment on a payment terminal without modifying the cash register software applications and the computerized accounting systems with which merchants are equipped. Only the addition of a module for processing data arising from the payment chain is necessary, without modifying the latter. This module is typically added to an item of equipment of the payment chain, for example an item of equipment of a bank providing a payment card used for the payment, without modifying the payment flows. The computerization costs for such a solution as well as the reliability of the solution are thus advantageous.

The collection of donations is particularly fast on account of the fact that it is entirely transparent, for the debtor and for the creditor, when executing the main transaction. The cash register operators are not solicited to collect the donations.

Furthermore, the installation of the method of managing donations according to the invention is particularly simple. Moreover, it enables real control and real traceability of the donations.

According to a particular embodiment, the method further comprises a step of configuring said at least one execution rule in said annex operation managing system.

According to a particular embodiment, the method further comprises a step of storing in memory at least one information item relative to the execution of said annex operation and a step of creating an execution history of annex operations.

According to a particular embodiment, said annex operation executing step comprises a step of sending data to at least one device that is distinct from said third party device.

According to a particular embodiment, said data sent to at least one device that is distinct from said third party device comprise a debit order and a credit order.

According to a particular embodiment, said steps of identifying at least one rule and of executing the annex operation are executed periodically according to the information received and stored beforehand.

The present invention also relates to a computer program comprising instructions adapted for the implementation of each of the steps of the method described earlier when said program is executed on a computer. The advantages procured by that computer program are similar to those referred hereinabove.

The invention also relates to a device for instructing annex operations linked to the execution of main transactions, said device comprising:
  a database;
  a module for acquiring and managing annex operations; and,
  a calculating module, the module for acquiring and managing annex operations and the calculating module being configured to
  receive data from a third party device of a bank payment system further comprising at least two distinct client devices, the bank payment system being configured to carry out a main transaction between the two client devices; and
  identify and execute at least partially a rule for executing an annex operation stored in the database according to the data received.

The device according to the invention thus provides the possibility of making donations at the time of a payment on a payment terminal without modifying the cash register software applications and the computerized accounting systems with which merchants are equipped. Only the addition of a module for processing data arising from the payment chain is necessary, without modifying the latter. This module is typically added to an item of equipment of the payment chain, for example an item of equipment of a bank providing a payment card used for the payment, without modifying the payment flows. The costs of computer setup for such a solution as well as the reliability of the solution are thus advantageous.

The collection of donations is particularly fast on account of the fact that it is entirely transparent, for the debtor and for the creditor, when executing the main transaction. The cash register operators are not called upon to collect the donations.

Furthermore, the installation of the device according to the invention is particularly simple. Furthermore, it enables real control and real traceability of the donations.

According to a particular embodiment, the device further comprises a configuration module, the configuration module enabling the storage of data in said database and the parameterization of rules for executing annex operations.

According to a particular embodiment, the device further comprises a communication interface for acquiring data that is configured to receive data from said third party device.

According to a particular embodiment, said communication interface for acquiring data is unidirectional.

According to a particular embodiment, the device further comprises a configuration communication interface configured to enable a user to input, parameterize or modify a rule for executing annex operations.

According to a particular embodiment, said configuration communication interface gives Internet access to a remote device.

According to a particular embodiment, the device further comprises a communication interface configured to send data to said bank payment system on execution of an annex operation.

BRIEF DESCRIPTION OF THE DRAWINGS

Other advantages, objects and features of the present invention will emerge from the following detailed description, given by way of non-limiting example, relative to the accompanying drawings in which.

DETAILED DESCRIPTION OF THE PREFERRED EMBODIMENTS

Figure 1:
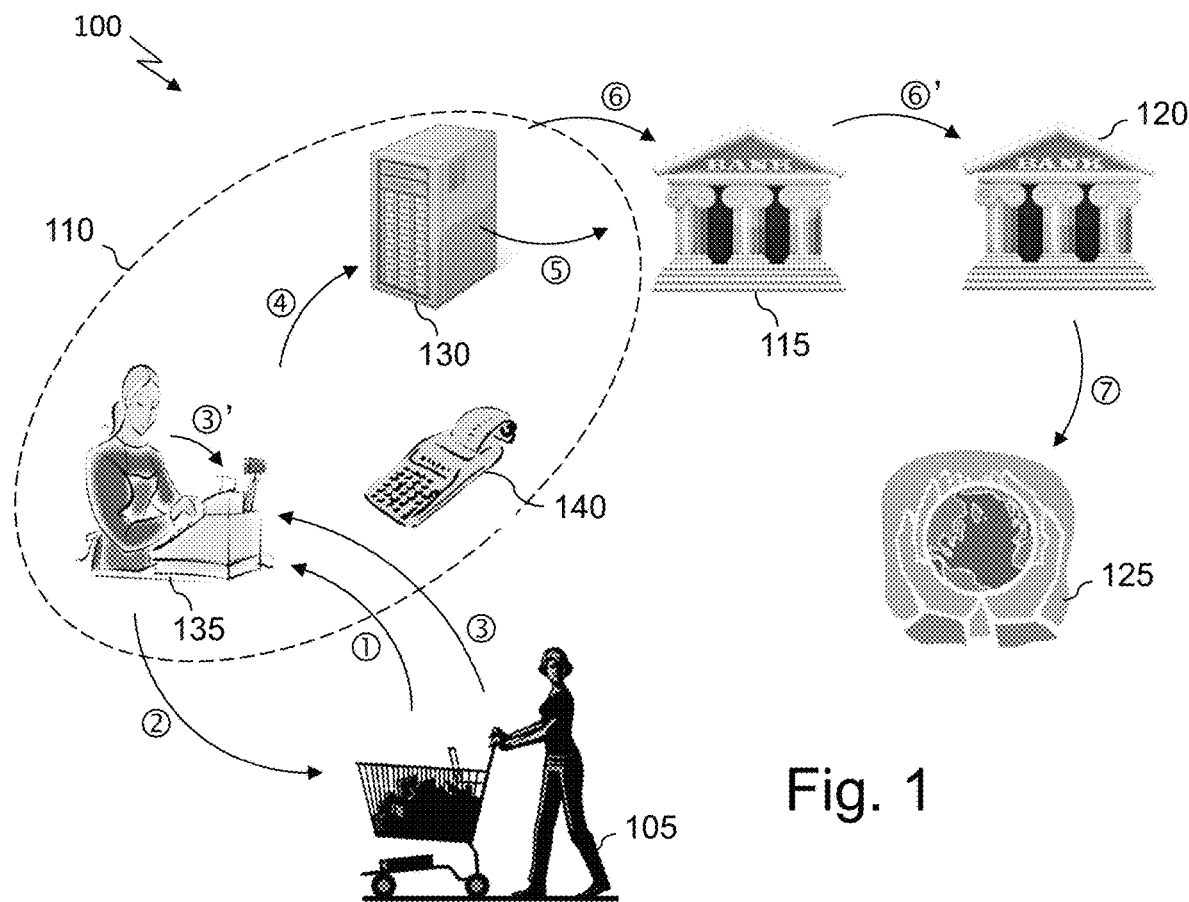
FIG. 1 diagrammatically illustrates an environment in which a mechanism for collecting donations can be implemented enabling a client to make a micro-donation at the time of a purchase, for example a donation of the difference between the price to pay and that price rounded to the integer above.

According to a particular mode of implementing the invention, a computer-implemented mechanism for instructing annex operations that are linked to the execution of main transactions, for example a donations collecting mechanism, makes use of a specific system connected to a system for executing main transactions to receive data therefrom, without interacting with that system for executing main transactions.

Thus, the system for executing main transactions is only slightly modified, solely to send information relative to the execution of main transactions.

A composite transaction here comprises a main transaction and at least one annex operation of which the execution automatically results in that of the main transaction. Such annex operations typically concern amounts and beneficiaries that are different from those of the main transaction. It may be recalled that a transaction is a commercial operation which, for the part to which a particular embodiment of the invention is directed, concerns a transfer of a monetary amount between a debtor and a creditor.

By way of illustration, a composite transaction may comprise the payment for a purchase (main transaction) combined with a donation (annex operation).

According to a particular embodiment, the management of the donations is confined for the most part to a particular computer system directed to the management of donations and the management of the donations themselves. This computer system for managing requests for donations and for managing the donations themselves is called annex operation managing system. It is, for example, a computer system implemented by a server connected to a bank server.

It is to be recalled here that the model which is known, in the field of computerized banking, by the name of four-corner model comprises a payment card of a holder, a payment terminal of a merchant, the merchant's bank and the holder's bank, the two banks being connected to each other via authorization networks also called bank intermediation networks.

According to this four-corner model, a client provided with a payment card, for example a card of Visa type (Visa is a trademark), may make payment for a purchase to a merchant having a payment terminal. The payment card is associated with a bank account (client account) managed by a computer system of a bank (typically the bank that issued the bank card or on behalf of which the bank card was issued). Similarly, the payment terminal is associated with a bank account (merchant account) managed by a computer system of a bank.

To make a purchase transaction, a client presents his payment card to a payment terminal of a merchant to which the amount has been provided manually or automatically. After validation of the purchase by the client, for example by entering a confidential code or PIN (acronym for Personal Identification Number), the payment terminal generally makes a request for authorization which is sent to the computer system of the card holder's bank via the computer system of the merchant's bank and a bank intermediation network.

The message is advantageously encrypted and comprises the identifiers of the client and of the merchant as well as the amount to be transferred.

After authentication and verification, in particular of the identity of the client and of that of the merchant as well as of the debtor's bank, a transfer acceptance message, preferably encrypted, is sent by the computer system of the client's bank to the computer system of the merchant' bank.

After having received a transfer acceptance message, a credit message is sent by the computer system of the merchant's bank to the address of the computer system of the bank managing the bank account with which is associated the payment card used via the bank intermediation network. This message is preferably encrypted.

It is observed here that the requests for bank intermediations may be accumulated and made on a deferred basis. The bank intermediation network may for example be the bank intermediation network MasterCard, Visa, GIE Carte Bancaire, SWIFT, STET or Target 2 (MasterCard, Visa, GIE Carte Bancaire, SWIFT, STET and Target 2 are trademarks).

The merchant's account is then credited with the transferred sum whereas the client account is debited with the same amount, typically on a deferred basis.

The encryption used for the data exchanges is, for example, based on a standard encryption algorithm using a public key and a private key, for example encryption of RSA type (RSA standing for Ronald Rivest, Adi Shamir and Leonard Adleman).

According to their nature and/or according to the source and/or destination devices, it may be that only certain exchanges can be encrypted.

In such a standard four-corner model, a main transaction cannot instruct one or more independent annex operations, in particular donations, without substantial modifications to the computer systems of the merchant's bank and to those of the bank managing the bank account with which is associated the payment card used.

In accordance with a particular embodiment, a particular computer system is associated with a bank server to collect information relative to the execution of transactions made by a card holder and to instruct annex operations, in particular donation operations, without modifying the processing of the transactions.

Figure 2:
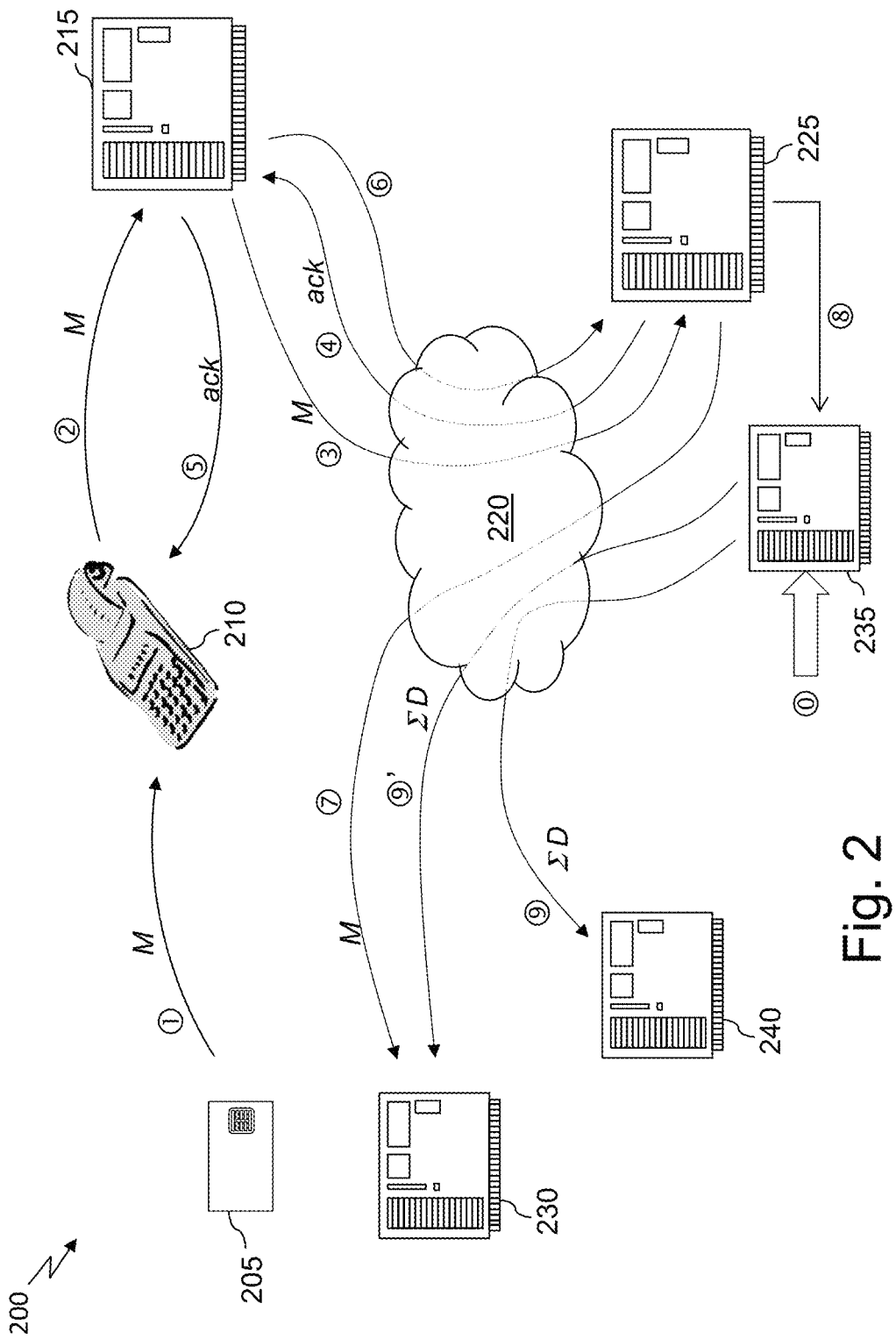
FIG. 2 diagrammatically illustrates a first example of an environment in which a particular embodiment of the invention may be implemented.

FIG. 2 diagrammatically illustrates a first example of an environment 200 in which a particular embodiment of the invention may be implemented based on the four-corner model.

As illustrated, a holder of a payment card 205 may make a payment at a payment terminal 210 itself connected to a bank computer system 215 of the bank of a merchant. This bank computer system 215 may in turn, via a bank intermediation network 220, enter into contact with a bank computer system 225 of the bank that issued the payment card used.

The bank computer system 225 is connected, via the bank intermediation network 220, to a bank computer system 230 of a bank managing an account of the holder of the payment card used, from which must be taken the amount of the purchases made. It is also connected to a server 235 implementing an annex operation managing system.

As illustrated, the server 235 implementing an annex operation managing system is itself connected, via the bank intermediation network 220, to the bank computer system 230 of a bank managing an account of the holder of the payment card used, from which must be taken the amount of the donations made and to a bank computer system 240 of a bank managing an account associated with one or more annex operations to be carried out (for example an account of an NGO to which donations are made).

It is observed here that if the bank computer system of the bank managing an account from which must be taken the amount of the purchases made is the same as the bank computer system of the bank managing an account from which must be taken the amount of the donations made, those systems and/or those accounts may be different.

The bank computer system 225 of the bank which issued the payment card used is preferably different from the bank computer system 230 of the bank managing an account of the holder of the payment card used, from which must be taken the amount of the donations made.

The protocols for communication between those different bank computer systems are preferably chosen from standard protocols, for example the IP protocols (IP standing for Internet Protocol) and X.25.

The bank intermediation network 220 is for example the bank intermediation network MasterCard, Visa, GIE Carte Bancaire, SWIFT, STET or Target 2.

The verification of annex operations is here carried out using an identifier associated with the payment card used and an annex operation managing system implemented in the computer system 235 connected to the bank computer system 225 of the bank that issued the payment card used.

The launching and the verification of annex operations may be broken down into two phases, a configuration phase and a utilization phase.

During the configuration phase (denoted ⓪ in FIG. 2), the holder of the card 205 configures characteristics specific to him (which may be grouped together in the form of a profile) in the computer system 235 connected to the bank computer system 225 of the bank that issued the payment card used.

Such a configuration consists for example in determining rules to calculate the amounts of donations and indicate the recipients.

This configuration phase is described in more detail with reference to FIG. 3.

The utilization phase directly concerns the launching and the verification of annex operations further to the execution of a main transaction.

On executing a main transaction, for example to make a purchase for an amount M, a client presents his payment card 205 to a payment terminal 210 of a merchant to which the amount M has been provided manually or automatically. After validation of the purchase by the client (step ①), for example by entering a confidential code or PIN code (PIN being an acronym for Personal Identification Number), the payment terminal 210 here makes an authorization request (step ②) which is sent to the bank computer system 225 of the bank that issued the payment card used (step ③), with the amount M, via the computer system 215 of the merchant's bank and the bank intermediation network 220.

The message is advantageously encrypted and comprises the identifiers of the client and of the merchant as well as the amount to be transferred.

After authentication and verification, in particular of the identity of the client and of that of the merchant as well as of the limits for amounts authorized by the payment card used, a transfer acceptance message (denoted ack), preferably encrypted, is sent by the bank computer system 225 of the bank which sent the payment card used to the computer system 215 of the merchant's bank then to the payment terminal 210 (steps ④ and ⑤).

After having received a transfer acceptance message, a debit message is sent by the computer system 215 of the merchant's bank to the address of the computer system 225 of the bank that issued the payment card used (step ⑥) via the bank intermediation network 220. This message is preferably encrypted.

A debit message is then sent by the bank computer system 225 of the bank that issued the payment card used to the address of the bank computer system 230 of a bank managing an account of the holder of the payment card used, from which must be taken the amount of the purchases made (step ⑦), via the bank intermediation 220. Again, this message is preferably encrypted.

It is observed here that the requests for bank intermediations may be accumulated and made on a deferred basis. Similarly, the credit and/or debit operations may be accumulated and made on a deferred basis.

The merchant's account is then credited with the transferred sum while the client's account is debited with the same sum, typically on a deferred basis, excluding commission (for example a merchant commission or an international payment commission).

The encryption used for the data exchanges is, for example, encryption using a public key and a private key, for example encryption of RSA type.

The bank computer system 225 of the bank that issued the payment card used here keeps an account journal comprising information relative to each main transaction made, for example the amount and an identifier associated with the payment card used (but preferably not enabling the number of the payment card used to be reconstituted (this card number enabling purchases to be made).

For each payment card managed by the corresponding bank computer system, account journal information is sent to the computer system 235 implementing the annex operation managing system (step ⑧), typically a software module. It may be sent for each main transaction or in batches, periodically.

This information is used to determine, on the basis of the configuration made by the holder of the card considered, the annex operations to be carried out, that is to say, for example, calculating a donation amount and identifying the recipient of the donations.

The annex operation managing system is described in more detail with reference to FIG. 3.

As illustrated diagrammatically in FIG. 2, a payment may be made in standard manner by the sending of a debit message from the computer system 235 implementing an annex operation managing system to the address of the bank computer system 230 of a bank managing an account of the holder of the payment card used, from which must be taken the amount of the purchases and/or of the donations made, and by the sending of a credit message from the computer system 235 implementing an annex operation managing system to the address of the bank computer system 240 of a bank managing an account of the recipient or recipients of the donation (steps ⑨ and ⑨'), via the bank intermediation network 220.

According to a particular embodiment, the payment of donations (credit and debit) is carried out by batch for a set of donations (i.e. a sum of donations ΣD). The payment of accumulated donations is advantageously carried out using a particular account managed by a third party, for example by the entity in charge of the annex operation managing system, also called a clearing account.

Figure 3:
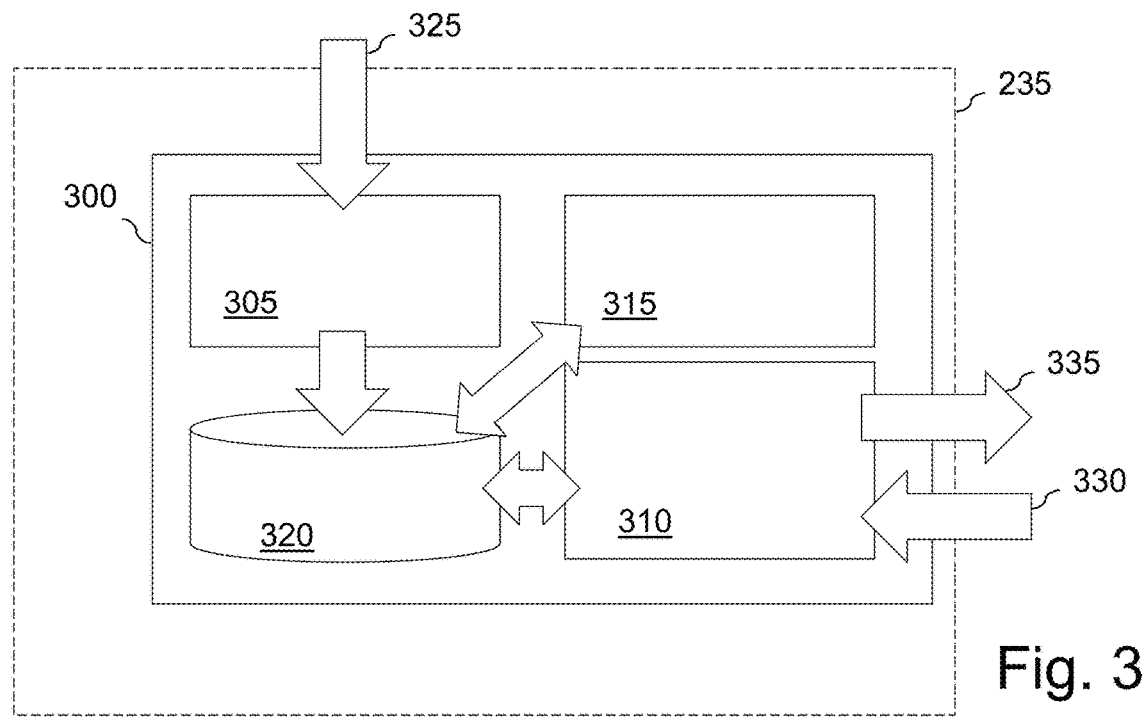
FIG. 3 diagrammatically illustrates an annex operation managing system.

FIG. 3 diagrammatically illustrates an annex operation managing system which may be implemented, for example, in a computer system connected to a bank computer system of a bank that issued a payment card enabling annex operations to be executed, for example the computer system 235 of FIG. 2.

As illustrated, the annex operation managing system 300 essentially comprises three modules 305, 310 and 315 as well as a database 320. The module 305 is a module configuration, the module 310 is a module for acquiring and managing annex operations for example for managing donations, and the module 315 is a calculating module, for example for calculating donations.

According to a particular embodiment, the modules 305, 310 and 315 are independent from each other.

As illustrated, the annex operation managing system 300 here comprises the communication interfaces 325, 330 and 335.

The communication interface 325 enables a user to interact with the configuration module 305. It is, for example, a local communication interface (for an access from an item of computer equipment implementing the annex operation managing system 300) or a remote communication interface (for access from a remote item of computer equipment via a communication network). The communication interface 325 preferably provides coding means enabling encryption of the exchanged data.

The configuration module 305 advantageously comprises a user interface operating with the communication interface 325 to enable a holder of a card managed by the manager of the annex operations managing system 300 to enter and parameterize the rules relative to annex operations. These rules may be stored in the form of tables in the database 320.

The access to the module may, according to a particular embodiment, be carried out from a remote computer, using a connection such as the Internet. This access is, preferably, protected by an identifier and a password provided to the card holder in advance in conventional manner.

Table 1, presented in the appendix hereto, illustrates an example of rules relative to annex operations, here donations.

Each row of the table here corresponds to a rule. According to the illustrated example, each rule is defined by an identifier (column 1), an identifier associated with a payment card or a group of identifiers associated with payment cards (column 2), a mode of calculating donations (column 3) and an identifier of a beneficiary or a group of identifiers of beneficiaries (column 4).

Of course, other information may be used in the definition of the rules. Thus, for example, the identifier associated with a payment card may be replaced by or complemented by a client identifier and/or an agreement identifier.

As indicated earlier, an identifier associated with a payment card preferably does not match the payment card number. According to a particular embodiment, such an identifier does not enable the card to be used for making a payment.

When a group of beneficiaries has been designated, the sharing of a donation between them is, preferably, predetermined.

Thus, for example, the rule having the identifier 2 applies to the payment card or the group of payment cards having the reference G53391, the beneficiaries of a first half of a donation being a beneficiary having the identifier 1 and for the second half of the donation a beneficiary having the identifier 2. The amount of the donation is determined here on the basis of the amount of the purchases (0.5%) or as a fixed amount (5€), the smallest value being the one chosen.

As described above, the parameterization of these rules may be carried out by a protected access to the annex operation managing system 300. By way of illustration, a payment card holder may, using an identifier specific to him or a reference of his payment card and a password, access all the rules associated with that identifier or that reference, that is to say sub-set of the rules in memory. The access to the rules makes it possible to add, modify or delete rules. The access may be made from some computer or other, from a tablet, a smartphone or any other similar device connected to the annex operation managing system 300 via a communication network such as the Internet and via a portal of web type.

The module 310 for acquiring and managing annex operations, for example managing donations, receives data from the bank computer system of the bank that issued the payment card used (typically the computer system on which the annex operation managing system 300 is implemented) via the communication interface 330. These data, coming from an account journal, typically comprise an identifier associated with the payment card as well as one or more amounts. They may be received by the module 310 periodically, for example daily or weekly, or on request.

The data received may be stored in the database 320 to be processed by the calculating module 315 or be directly sent thereto.

It is, for example, a local communication interface (for an access from an item of computer equipment implementing the annex operation managing system 300) or a remote communication interface (for access from a remote item of computer equipment via a communication network). The communication interface 330 preferably provides coding means enabling encryption of the exchanged data. The communication interface 330 is advantageously unidirectional to enable the reception of data from a bank computer system without authorizing the sending of data to that system, thereby ensuring, in relation to the module 310 for acquiring and managing annex operations, the integrity of the data managed by the bank computer system to which it is connected.

The module 310 for acquiring and managing annex operations manages the results provided by the calculating module 315.

The calculating module 315 uses the rules associated with an identifier associated with the payment card considered, typically an identifier received by the module for acquiring and managing annex operations, stored here in the database 320, to determine the annex operations to perform.

According to a particular embodiment, the module 315 carries out some of the annex operations to carry out, such as the calculations concerned without the rules, for example the calculations of amounts of donations.

The results obtained by the module 315 are, preferably, stored in the database 320, for example in the form of journals of results, for example journals of donations.

Such a journal comprises, for example, for each transaction carried out, as illustrated in table 2 given in the appendix hereto, a transaction reference (column 1), a payment card identifier (column 2), a purchase amount (column 3), an amount of one or more donations made and the associated beneficiary or beneficiaries (column 4), it being observed that the amount of a donation may be shared between several beneficiaries.

A journal of the donations may comprise other information such as an identifier of the merchant associated with the transaction having led to the donations considered. Furthermore, the journal of the donations may comprise the amount T of the payment, representing the sum of the amount M of purchases and of the amount of the corresponding donations.

By way of illustration, the row of the journal concerning the transaction identified by the reference 2 corresponds to a transaction made by a payment card referenced G53391, the amount of the purchases made being 87.45€ and the amount of the donation of 0.44€ being shared equally between the beneficiaries identified by the references 1 and 2.

The journals of results are accessed periodically, for example every month, by the module 310 for acquiring and managing annex operations.

In the context of donations, the module 310 determines, for example, the total of the donations associated with a payment card in order to debit an account of the holder of the card and credit the account or accounts designated as recipients.

These operations of debit and credit are carried out according to a standard scheme such as those described earlier, using the communication interface 335. By way of illustration, the communication interface 335 gives access to and from a bank intermediation network.

It is observed here that the debit and credit operations are particularly simple to perform for a bank sub-contractor. According to a particular embodiment, the results journals are kept, with an indication specifying that the corresponding operations of debit and credit have been performed, to make it possible, for example, to issue statements of donations which may in particular be used for tax purposes. Such statements are typically issued on request, for example using the configuration module 305 which may comprise consultation tools.

Figure 4:
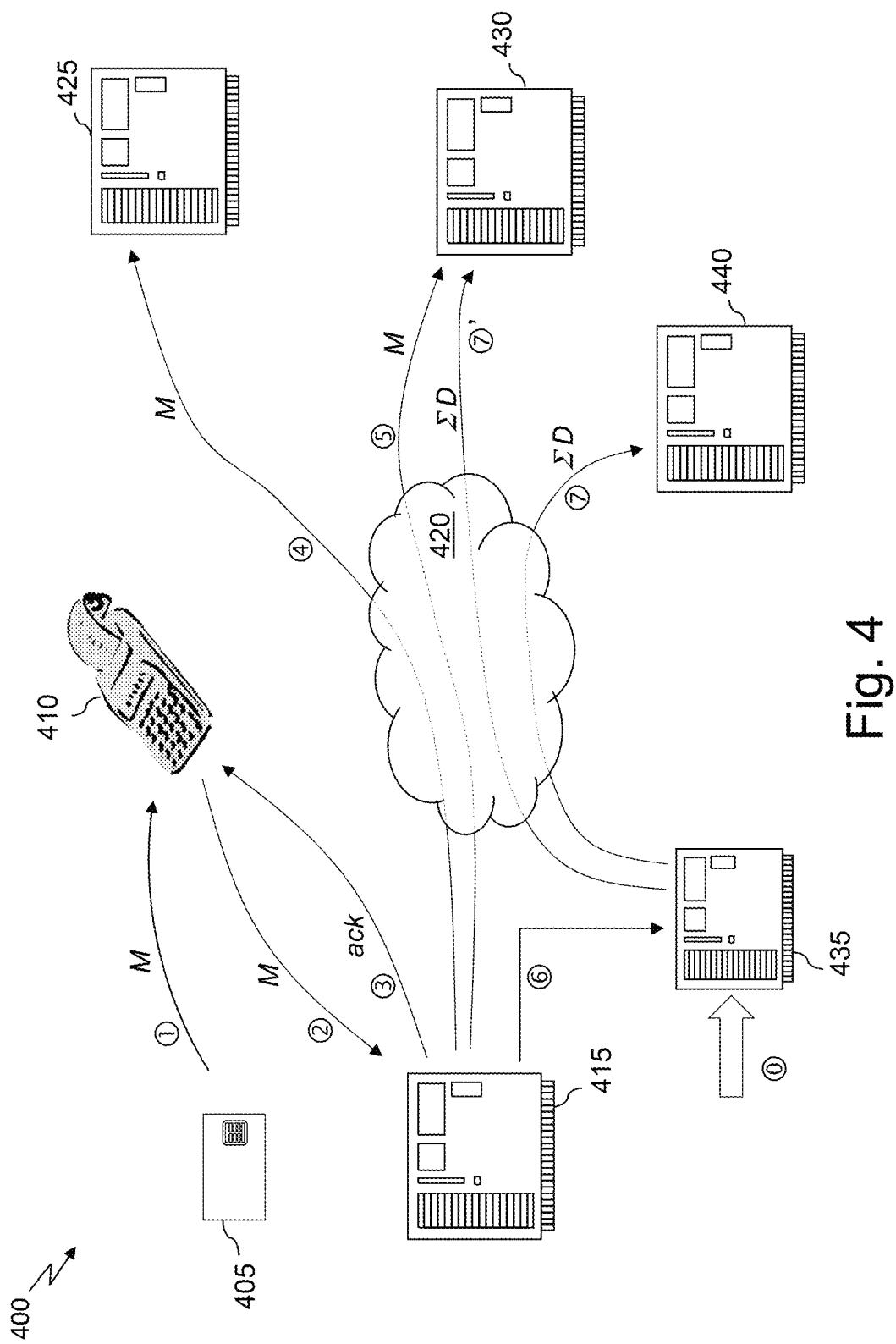
FIG. 4 diagrammatically illustrates a second example of an environment in which a particular embodiment of the invention may be implemented.

FIG. 4 diagrammatically illustrates a second example of an environment 400 in which a particular embodiment of the invention may be implemented based on the model known as the three-corner model.

It may be recalled here that, according to this model for payment by bank card, a single bank computer system is involved for the processing of a transaction. There is a separation between the management of the system for the payment cards and the holding of the debited and credited accounts. The single bank computer system passes by systems for compensation and for payment to credit the merchant and debit the holders.

As illustrated in FIG. 4, a holder of a payment card 405 may make a payment at a payment terminal 410 itself connected to a single bank computer system 415. This single bank computer system 415 may in turn, via a bank intermediation network 420, enter into contact with a bank computer system 425 of the merchant's bank and with a bank computer system 430 of the bank of the holder of the card used.

Lastly, the single bank computer system 415 is connected to a computer system 435 implementing an annex operation managing system.

As illustrated, the computer system 435 is itself connected, via the bank intermediation network 420, to the bank computer system 430 of a bank managing an account of the holder of the payment card used, from which must be taken the amount of the donations made, as well as to a bank computer system 440 of a bank managing an account associated with one or more annex operations to be made, for example an account of an NGO.

The protocols for communication between these different bank computer systems are, preferably, chosen from among standard protocols, for example the IP and X.25 protocols.

The bank intermediation network 420 is for example the bank intermediation network MasterCard, Visa, GIE Carte Bancaire, SWIFT, STET or Target 2.

The single bank computer system 415 is, for example, a computer system of Amex type (Amex is a trademark).

The verification of the annex operations is here made using an identifier associated with the payment card used and using an annex operation managing system implemented in a computer system connected to the single bank computer system.

According to the example illustrated in FIG. 4, the single bank computer system 415 is that of the bank that issued the payment card used.

As described above with reference to FIG. 2, the launching and the verification of annex operations may be broken down into two phases, a configuration phase and a utilization phase.

The configuration phase (denoted ⓪ in FIG. 4) is similar to that described above with reference to FIG. 3. Again, this configuration consists for example in determining rules to calculate the amounts of donations and indicate the recipients.

The phase of utilization directly concerns the launching and the verification of annex operations when a main transaction is made.

On executing a main transaction, for example to make a purchase for an amount M, a client presents his payment card 405 to a payment terminal 410 of a merchant to which the amount M has been provided manually or automatically. After validation of the purchase by the client (step ①), for example by entering a confidential code or PIN code (PIN being an acronym for Personal Identification Number), the payment terminal 410 here makes a request for authorization of the single bank computer system 415 (step ②).

The message is advantageously encrypted and comprises the identifiers of the client and of the merchant as well as the amount to be transferred.

After authentication and verification, in particular of the identity of the client and of that of the merchant as well as of the limits for the amounts authorized by the payment card used, a transfer acceptance message (denoted ack), preferably encrypted, is sent by the single bank computer system 415 to the payment terminal (step ③).

A credit message is then sent by the single bank computer system 415, via the bank intermediation network 420, to the computer system 425 of the merchant's bank (step ④).

In the same way, a debit message is sent by the single bank computer system 415, via the bank intermediation network 420, to the computer system 430 of a bank managing an account of the holder of the payment card used (step ⑤).

These debit and credit messages, concerning an amount M, are preferably encrypted.

It is observed here that the requests for debit and/or credit may be accumulated and carried out on a deferred basis.

The merchant's account is then credited with the transferred sum while the client's account is debited with the same sum, typically on a deferred basis, excluding commission (for example a merchant commission or an international payment commission).

The encryption used for the data exchanges is, for example, encryption using a public key and a private key, for example encryption of RSA type.

The single bank computer system linked to the bank that issued the payment card used here keeps an account journal comprising information relative to each main transaction made, for example the amount and an identifier associated with the payment card used (but preferably not enabling the number of the payment card used to be reconstituted (this card number enabling purchases to be made).

For each payment card managed by the single bank computer system 415, account journal information is sent to an annex operation managing system, typically a software module, of the computer system 435 (step ⑥). It may be sent for each main transaction or in batches, periodically.

It is typically used to determine, on the basis of the configuration made by the holder of the card considered, the annex operations to be carried out, that is to say, for example, calculating a donation amount and identifying the recipient of the donations.

This annex operation managing system may be similar to that described above with reference to FIG. 3.

As illustrated diagrammatically in FIG. 4, a payment of donations may be carried out by the annex operation managing system of the computer system 435, in standard manner, by the sending of a debit message to the address of the bank computer system 430 of the bank managing an account of the holder of the payment card used, from which must be taken the amount of the donations made, and by the sending of a credit message to the address of the bank computer system 440 of a bank managing an account of the recipient of the donations (steps ⑦ and ⑦'). The operations of debit and of credit are carried out here via the bank intermediation network 420.

When there are several recipients for the donations, several credit messages are sent.

According to a particular embodiment, the payment of donations (credit and debit) is carried out by batches for a set of donations (i.e. a sum of donations $\Sigma D$). Again, the payment of accumulated donations is advantageously made using a clearing account.

Figure 5:
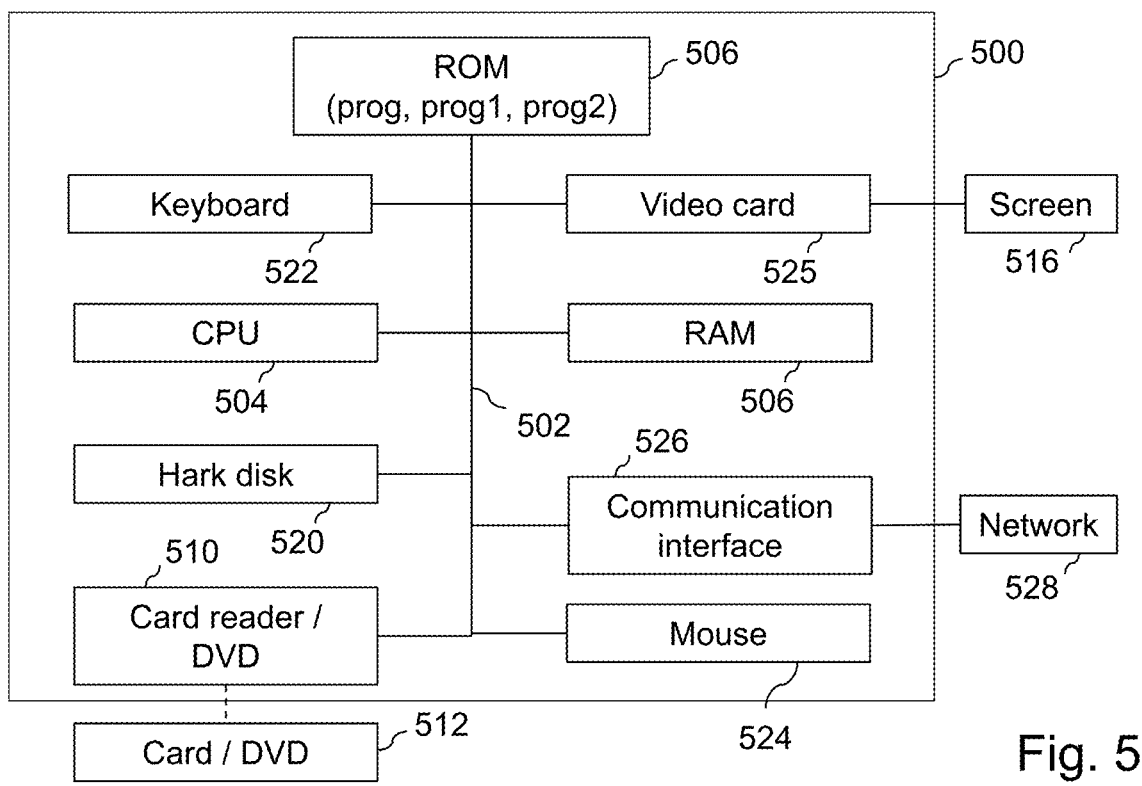
FIG. 5 illustrates an example of an information processing device adapted to implement, at least partially, an embodiment of the invention.

FIG. 5 illustrates an example of a device able to be used to at least partially implement an embodiment, in particular of the steps described with reference to FIGS. 2, 3 and 4. The device 500 is for example a server, a computer or a personal digital assistant.

The device 500 preferably comprises a communication bus 502 to which are connected:
  a central processing unit (CPU) or microprocessor 504;
  a read only memory 506 (ROM) able to include the operating system and programs such as "Prog";
  a Random Access Memory (RAM) or cache memory 508, comprising registers adapted to record variables and parameters created and modified during the execution of the aforementioned programs;
  a reader 510 of a removable storage medium 512 such as a memory card or a disc, for example a DVD disc; and
  a graphics card 514 linked to a screen 516.

Optionally, the device 500 may also have the following items:
  a hard disk 520 able to contain the aforesaid programs "Prog" and data processed or to be processed according to the invention;
  a keyboard 522 and a mouse 524 or any other pointing device such as an optical stylus, a touch screen or a remote control enabling the user to interact with the programs according to the invention, in particular to initiate a transfer of money, to configure rules for requests for donations, follow one or more lists of donations and to obtain a tax receipt; and
  a communication interface 526 connected to a distributed communication network 528, for example the Internet network, the interface being able to transmit and receive data.

The communication bus allows communication and interoperability between the different elements included in the device 500 or connected to it. The representation of the bus is non-limiting and, in particular, the central processing unit may communicate instructions to any element of the device 500 directly or by means of another element of the device 500.

The executable code of each program enabling the programmable apparatus to implement the processes according to the invention may be stored, for example, on the hard disk 520 or in read only memory 506.

According to a variant, the executable code of the programs can be received by the intermediary of the communication network 528, via the interface 526, in order to be stored in an identical fashion to that described previously.

More generally, the program or programs may be loaded into one of the storage means of the device 500 before being executed.

The central processing unit 504 will control and direct the execution of the instructions or portions of software code of the program or programs according to the invention, these instructions being stored on the hard disk 520 or in the read-only memory 506 or in the other aforementioned storage elements. On powering up, the program or programs which are stored in a non-volatile memory, for example the hard disk 520 or the read only memory 506, are transferred into the random-access memory 508, which then contains the executable code of the program or programs according to the invention, as well as registers for storing the variables and parameters necessary for implementation of the invention.

Naturally, to satisfy specific needs, a person skilled in the art will be able to apply modifications in the preceding description. The present invention is not limited to the described embodiments, other variants and combinations of features are possible.

In particular, it is observed here that although, for the purposes of illustration, the invention has been described according to particular embodiments, there are other variants.

Thus, for example, the invention may be implemented in a context of payment via network, in particular payments by Internet such as payments of secure on-line shopping type or of m-POS type (m-POS standing for mobile Point of Sale).

Similarly, still by way of illustration, the invention may be implemented at the time of operations of withdrawal type (a donation being made for each withdrawal, which may or may not be based on certain limits).

The present invention has been described and illustrated in the present detailed description with reference to the appended Figures. However, the present invention is not limited to the embodiments presented. Other variants and embodiments may be deduced and implemented by the person competent in the field of the invention on reading the present description and appended Figures.

In the claims, the term "comprise" does not exclude other elements or other steps. The indefinite article "a" does not exclude the plural. A single processor or several other units may be used to implement the invention. The different features presented and/or claimed may advantageously be combined. Their presence in the description or in different dependent claims, does not indeed exclude the possibility of combining them. The reference signs are not to be understood as limiting the scope of the invention.

APPENDIX

TABLE 1

| ID rule | PC REF | RULE | Beneficiary ID |
|---|---|---|---|
| 0 | 543291 | Round up | 1 |
| 1 | 1294G3 | €1 fixed amount per transaction | 1 (€0.40), 3 (€0.60) |
| 2 | G53391 | Lowest of 0.5% of the transaction and €5 | 1 (50%), 2 (50%) |
| ... | ... | ... | ... |
| n | 491503 | Round up | 1 |

TABLE 2

| ID trans. | PC REF | M | D. b |
|---|---|---|---|
| 0 | 543291 | €425.66 | 1: €0.34 |
| 1 | 543291 | €35.14 | 1: €0.86 |
| 2 | G53391 | €87.45 | 1: €0.22, 2: €0.22 |
| ... | ... | ... | ... |
| p | 1294G3 | €118.00 | 1: €0.40, 3: €0.60 |

The invention claimed is:

1. A method of instructing an annex operation linked to the execution of a main transaction, the method being implemented in an annex operation managing system that is connected to a third party device of a bank payment system including at least two distinct client devices, the bank payment system being configured to carry out a main transaction between the two client devices, the method comprising:
   receiving information relative to the execution of said main transaction between the two client devices, said information being received from said third party device;
   identifying at least one execution rule for executing the annex operation according to at least one first information item of the received information; and
   executing the annex operation according to said at least one identified rule and according to at least one second information item of said received information, that is distinct from said first information item, the at least one second information item being one of a payment card identifier associated with a payment card of one of the client devices that does not match a payment card number of the payment card, and a beneficiary identifier that identifies one or more beneficiaries.

2. The method according to claim 1, further comprising configuring said at least one execution rule in said annex operation managing system.

3. The method according to claim 1, further comprising:
   storing in a memory at least one information item relative to the execution of said annex operation; and
   creating an execution history of annex operations.

4. The method according to claim 1, wherein said executing the annex operation comprises sending data to at least one device that is distinct from said third party device.

5. The method according to claim 4, wherein said data sent to at least one device that is distinct from said third party device comprise a debit order and a credit order.

6. The method according to claim 1, wherein said identifying at least one rule and the executing the annex operation are executed periodically according to the information received and stored beforehand.

7. A non-transitory computer-readable medium comprising instructions configured to carry out the method according to claim 1 when said program is executed on a computer.

8. A device for instructing annex operations linked to the execution of main transactions, said device comprising:
   a database;

a module for acquiring and managing annex operations; and, a calculating module, the module for acquiring and managing annex operations and the calculating module being configured to receive data from a third party device of a bank payment system including at least two distinct client devices, the bank payment system being configured to carry out a main transaction between the two client devices, the data including a first identifier of a rule and a second identifier of the rule, the second identifier of the rule being one of a payment card identifier associated with a payment card of one of the client devices that does not match a payment card number of the payment card, and a beneficiary identifier that identifies one or more beneficiaries, and identify and execute at least partially the rule for executing an annex operation stored in the database according to the data received based on the received first identifier and the received second identifier.

9. The device according to claim 8, further comprising a configuration module enabling the storage of data in said database and the parameterization of rules for executing annex operations.

10. The device according to claim 8, further comprising a communication interface configured to acquire data that is configured to receive data from said third party device.

11. The device according to claim 10, wherein said communication interface is unidirectional.

12. The device according to claim 8, further comprising a configuration communication interface configured to enable a user to input, parameterize or modify a rule for executing annex operations.

13. The device according to claim 12, wherein said configuration communication interface gives Internet access to a remote device.

14. The device according to claim 8, further comprising a communication interface configured to send data to said bank payment system on execution of an annex operation.

15. The method according to claim 2, further comprising:

storing in memory at least one information item relative to the execution of said annex operation; and creating an execution history of annex operations.

16. The method according to claim 2, wherein said executing the annex operation comprises sending data to at least one device that is distinct from said third party device.

17. The method according to claim 3, wherein said executing the annex operation comprises sending data to at least one device that is distinct from said third party device.

18. The method according to claim 2, wherein said identifying at least one rule and executing the annex operation are executed periodically according to the information received and stored beforehand.

19. The method according to claim 3, wherein said identifying at least one rule and executing the annex operation are executed periodically according to the information received and stored beforehand.

* * * * *